United States Patent
Bera

(10) Patent No.: US 8,122,349 B2
(45) Date of Patent: *Feb. 21, 2012

(54) LISTING AND MODIFYING GROUPS OF BLOCKS IN THE EDITING OF A DOCUMENT

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1156 days.

This patent is subject to a terminal disclaimer.

(21) Appl. No.: 11/876,213

(22) Filed: Oct. 22, 2007

(65) Prior Publication Data

US 2008/0040664 A1 Feb. 14, 2008

Related U.S. Application Data

(63) Continuation of application No. 10/321,972, filed on Dec. 17, 2002, now Pat. No. 7,296,228.

(51) Int. Cl.
*G06F 17/00* (2006.01)
(52) U.S. Cl. .............. 715/255; 715/256; 715/272
(58) Field of Classification Search .......... 715/212, 715/217, 255, 256, 272, 200
See application file for complete search history.

(56) References Cited

U.S. PATENT DOCUMENTS

| | | | |
|---|---|---|---|
| 5,079,700 A | 1/1992 | Kozoll | |
| 2001/0054049 A1* | 12/2001 | Maeda et al. | 707/517 |
| 2002/0016796 A1* | 2/2002 | Hurst et al. | 707/500 |
| 2002/0107893 A1* | 8/2002 | Ohkouchi et al. | 707/514 |
| 2002/0152240 A1* | 10/2002 | Kitainik et al. | 707/517 |
| 2003/0160826 A1* | 8/2003 | Tran et al. | 345/771 |
| 2003/0222897 A1 | 12/2003 | Moore | |
| 2004/0117737 A1* | 6/2004 | Bera | 715/530 |
| 2004/0177315 A1* | 9/2004 | Brown et al. | 715/500 |
| 2004/0177321 A1* | 9/2004 | Brown et al. | 715/513 |
| 2004/0205592 A1* | 10/2004 | Huang | 715/513 |

OTHER PUBLICATIONS

Microsoft Excel 2001 (hereinafter Excel2001), copyright 2001, pp. 1-31.*
Microsoft Excel Printout, copyright 1999, pp. 1-19.
Microsoft Excel Printouts, copyright 1999, pp. 20-23.
Microsoft Notepad Printouts, copyright 2001, pp. 1-23.

* cited by examiner

*Primary Examiner* — Thu Huynh
(74) *Attorney, Agent, or Firm* — Anthony England; William Steinberg

(57) ABSTRACT

Grouping blocks of text according to user-defined contexts, and editing group specific blocks can be used to improve document consistency during editing and revising of electronic documents. A change made in one block often requires appropriate changes to be made in other blocks that are contextually related to the changed block. Such changes are made to ensure this consistency. Commands that deal with block groups (such as, create group, add block to group(s), delete block from group(s), edit group, merge group, etc.) are provided to assist a user in editing documents.

17 Claims, 2 Drawing Sheets

LISTING AND MODIFYING GROUPS OF BLOCKS IN THE EDITING OF A DOCUMENT

CROSS REFERENCE TO RELATED APPLICATION

This is a continuation of, and hereby claims the benefit of the priority date of, application Ser. No. 10/321,972 of Dec. 17, 2002.

FIELD OF THE INVENTION

The present invention relates to document editing and relates particularly to editing text-based electronic documents.

BACKGROUND

Various computer-based tools currently exist for manipulating text-based electronic documents, such as those provided by word processing applications or simple command-based text editors.

In word processing applications, user-defined "styles" can be used to format text. For example, subject headings can be given a particular style. When the user-defined style is updated, all instances of the formatted text are correspondingly updated accordingly. Using this feature, cumbersome revisions are simplified, and possibility for error reduced.

Further, word processing applications typically have a find/replace feature that can be used in the following manner. Particular text, such as certain words, can be replaced with other text, such as a replacement word. This feature also reduces the work involved in making necessary editorial changes to a document.

For example, a change of terminology may be desirable, in which case an appropriate "find and replace" operation can be performed on the relevant term. Also, formatting options can also often be used in find/replace features. For example, in an electronic document, all italicised text can be formatted in bold using an appropriate find/replace operation.

The above discussed features are provided in word processor applications for their users' convenience. Revising and editing electronic documents can be a difficult exercise to perform correctly, and these features assist in making necessary revisions.

In view of the above observations, a need clearly exists for methods that still further improve the editing of electronically stored and manipulated documents.

SUMMARY

Grouping blocks of text according to user-defined contexts, and editing group specific blocks provides various advantages. In particular, document consistency can be maintained during editing and revising of electronic documents. A change made in one block will often require appropriate changes to be made in other blocks that are contextually related to the changed block. Such changes are made to ensure this consistency.

Commands that deal with block groups (such as, create group, add block to group(s), delete block from group(s), edit group, merge group, etc.) are provided to assist a user in editing text.

Features additional to those provided by existing word processor applications can be provided to address context-related blocks as a group, create/modify the group membership of blocks, list groups to which a block belongs, list blocks belonging to a group, carry out search operations in blocks that belong only to one or more designated groups, etc. Such features can be provided in other text-based editing tools, in applications such as desktop publishing applications, databases, etc.

Examples of the described techniques are provided in relation to blocks of text. However, user-defined blocks can, in principle, involve digital content of any kind, such as video clips, audio clips, etc or any combination thereof, provided such information is mapped as (or linked through) a sequence of symbols in the document. This is because like text, audio, video and other forms of information are also internally stored as binary strings in digital computers. Therefore, in principle, such strings can be mapped into character strings or other symbols through a mapping algorithm.

DETAILED DESCRIPTION

A method, a computer system and computer software are each described in the context of editing electronic text-based documents using a word processor-type application executing on a computer system.

Definitions

A document, as referred to herein, describes an electronically-stored text-based computer file such as a word-processing document representing a letter, story etc. A text-based document does not necessarily comprise only text, but can also comprise other digital content, such as audio or video encoded as text through the use of mapping algorithms.

A block is any contiguous group of symbols, such as alphanumeric characters, that form part of a document. Symbols can include additional characters typically used with alphanumeric characters, such as punctuation marks, or other symbols such as chemical symbols, musical notation or other icons.

Problem Statement

Let D be a document within which there are designated parts called blocks $b_{ij}$, i=1, 2, ..., n, and j=1, 2, ..., m(i) of the document. The index i refers to a block group, and the index j to a member block within the block group i. The size of each block (measured in bytes) is independent of the size of any other block. The size of any of the blocks does not exceed the size of the document D.

Figure 1:
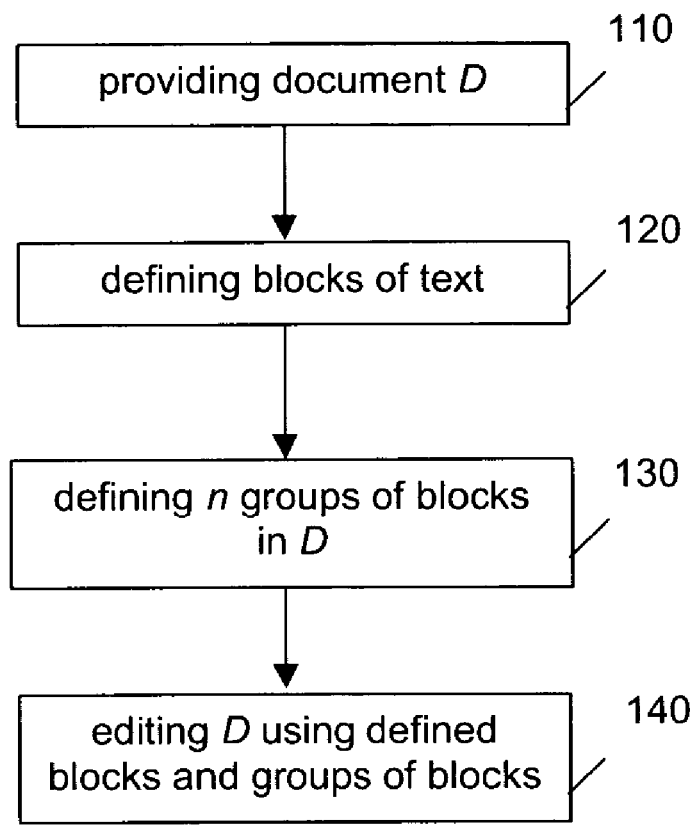
FIG. 1 is a flowchart of steps involved in editing a text-based document.

FIG. 1 represents the steps involved in editing a text-based document D. In step 110, a document D is provided, in which blocks of text are defined in step 120. In step 130, n groups of blocks are defined. Document D can be edited in step 140 using the defined blocks and groups of blocks.

A block can completely or partially overlap one or more other blocks, or contain other blocks within itself, provided that any such overlap does not result in two or more blocks sharing a common block group. This exception is required to avoid confusion regarding the extent of each block when two or more blocks belonging to the same block group overlap.

Member blocks $b_{ij}$ in a group $B_i = \{b_{i1}, b_{i2}, \ldots b_{im}\}$ are generally assumed to share something in common or are related to each other in some conceptual way. For example, the blocks in a group may be considered related to each other because they collectively describe a particular product X, say, out of a group of products, which includes product X, and all of which products are described in the document. A block can completely or partially belong to more than one block group. For example, a block may contain information shared in common by two or more products being described in the document. Further examples, 1 to 5 are outlined below under corresponding titled subsections.

A block can be any chosen contiguous sequence of symbols in a document. This contiguous sequence is treated as a unit and referred to as a block. The sequence may be empty (or null), that is, devoid of any characters and symbols. A block may consist of only a single character and this character may be a blank. (A blank character or a null block often serves as a convenient placeholder for other characters and symbols to be filled in later. An example of a blank character is whitespace character placed between adjacent words in a sentence.

The described techniques involve carrying out editing tasks on the document D within a block group or combinations of block groups. The following five examples show the importance of having such means available for editing documents.

EXAMPLE 1

Patent Specifications

Various sections of a document representing a patent specification are commonly related to each other and use language that is similarly worded. A frequent example of similar or related words is a verb or a verb phrase occurring in various tense forms. Thus, if a section of the document is modified, then each of any other related sections is also appropriately modified. Such correlated modification can be facilitated if each of the related sections (that is, blocks) of the document is appropriately identified as belonging to the same block group.

EXAMPLE 2

Reference Books

Cross references in reference books such as dictionaries are frequently made to related material elsewhere in the book. When editing the manuscript of such a book, the impact of modifications made in one part of the book must be correctly reflected in all other related parts of the book. Appropriately updating the contents of the book can be advantageously facilitated if each of the related portions (that is, blocks) of the book are appropriately identified as belonging to the same block group.

EXAMPLE 3

Forms

Items appearing on forms (for example, tax returns) are often related to each other. Each such item can be treated as a block, and the items collectively can then form a block group.

EXAMPLE 4

Computer Program

Various blocks of statements in a computer program may be contextually related to each other. For example, the blocks written by a particular programmer, or blocks related to a specific condition during execution, are contextually related to each other. If one of the blocks is modified, then usually a check is necessarily made, and if necessary a modification made, of all related blocks of statements in the program. Such checks can be desirably performed with ease as related blocks can be readily identified.

EXAMPLE 5

Notes

A set of notes, created extempore, but tagged according to the section or subsection of the final document to which the set may belong, can be reorganised, edited and inserted when the manuscript is being revised or finalized.

Comments on Above Examples

In all the above examples, ensuring the correctness and completeness of modifications having consequential effects can be a laborious, difficult, time-consuming and tedious exercise. Consequently, errors occur when required consequential revisions are not made. This is a common experience, as the exercise is a manual one. Accordingly, there are clear and desirable advantages in at least partly automating this unrewarding task.

Automation can be provided, in accordance with the techniques described below, by providing an application program that searches for tag pairs rather than write a customised application program for each type of document. Tag pairs are attached to blocks which are identified and marked for tagging by a user. This user may, for example, typically be the author of the document or, alternatively, an experienced editor.

A list of block and block group commands is described below. These commands are generally desirable for editing blocks in documents, and an explanation of what each command does is provided below. Additional commands may be added as required. For example, additional commands may be: (i) to collate blocks belonging to a block group into a file, or (ii) to automatically attach selected blocks to an email message, or (iii) to find and edit blocks that belong to a group of block groups fulfilling some criteria rather than a single block group, etc.

Group and Block Commands

A block is identified by means of a unique pair of group tags (comprising an opening tag and a closing tag, also referred to, respectively, as left and right tags). Each member block of a block group is enclosed by these tags for identification purposes.

Each block group has a unique name, which appears in both the opening and closing members of a group's pair of tags, usually along with one or more predetermined characters in a particular predefined format. For example, for the block group identified by the name biosphere, left and right tags are, respectively, <!biosphere> and <biosphere!>. The predetermined characters ("<", "!" and ">") are used for predetermined formatting of the opening and closing tags in a manner which is clear from the example given above.

A few block group names, such as, AUDIO, VIDEO, etc. may be reserved, to identify blocks which are audio-clips, video-clips, etc. When such a non-text block is to be edited, the block is sent to an appropriate editor, and when the block's editing is complete, the block is returned to the block editor, which replaces the earlier version of the block with the edited version.

For editing a block or a block group in a document, commands are provided to create, select, delete blocks and block groups, and modify the contents of the block or block group.

The following set of commands are preferably provided. Other commands or variations of these commands can also be provided.

select block(s),
    create group,
    add block to group(s),
    delete block from group(s),
    delete group(s),
    edit block,
    edit group,
    merge groups,
    list block's groups,
    list blocks in group,
    list groups,
    display block with tags,
    remove tags from block,
    compare blocks,
    prefix/postfix block to group(s),
    find block with string,
    find block satisfying search criteria.

These commands may be effected through various means, such as, from a menu of commands displayed on a screen, by assigned key sets selected from the keyboard, voice commands, etc. A brief example and accompanying description of each of the above commands is provided below.

EXAMPLE 6

Select Block(s)

Select block(s). The user can select one or more blocks, for example, by marking them out on the monitor screen (that is, within the text-editor application). This select operation is usually carried out prior to some other command such as create group.

By way of example, consider the following short text.

The talking parrot and the dumb man were a fine pair. They went together everywhere. The man was oblivious of the chatter the parrot would sometimes indulge in. The indifference did not seem to matter to the parrot.

In this case, three blocks are selected, as indicated by each respective contiguous underlined sequence of text.

EXAMPLE 7

Create Group

Create group. A search is performed to check whether a list of block groups exists. If a list of block groups does not exist, then an empty list is created. A user is prompted for the block group's name, or a default name is automatically assigned. The specified or assigned name is added to the current list of block group and a new pair of group tags $(T_L, T_R)$ is reserved for the group. Then, each of the selected blocks is enclosed within this new pair of group tags $(T_L, T_R)$.

With reference to Example 6 above, assume that the selected blocks are to belong to a new block group named b15. The newly reserved pair of group tags is therefore $(T_L, T_R)=$(<!b15>, <b15!>). Each block in the example is tagged with this pair of group tags (<!b15>, <b15!>). After the tagging operation has been completed the example appears as shown below.

<!b15>The talking parrot<b15!> and the dumb man were a fine pair. They went together everywhere. The man was oblivious of the chatter <!b15>the parrot<b15!> would sometimes indulge in. The indifference did not seem to matter <!b15>to the parrot<b15!>.

EXAMPLE 8

Add Block to Group(s)

Add block to group(s). The list of current block groups is indicated by an automatic invocation of the list groups command (an example of which is given below). The user can select one or several block groups from this list. The block to be added to the selected block groups is enclosed within the pair of each of the selected groups' tags, one by one.

By way of example, let the automatic invocation of the list groups command list the currently active block groups as b1, b4, b15, b16, b18, b20. The group numbers missing in the sequence 1 to 20 have been deleted at some stage after their creation, or were never created. From the listed active block groups, assume that block groups b4 and b15 are selected. Let "kept in the cage" be the block to be added to all the selected block groups. Adding this block to block groups b4 and b15 means enclosing the above block (that is, "kept in the cage") with the block group tag pairs corresponding to block groups b4 and b15, respectively.

Thus, the selected block is now framed by tags as follows: <!b15><!b4>kept in the cage<b4!><b15!>. With these new tags, the block "kept in the cage" belongs to block groups b4 and b15, as well as any other blocks, if any, to which this block may already belong. The sequence in which a block's opening (and, likewise, its closing) tags appear is immaterial. Accordingly, <!b4><!b15>kept in the cage<b4!><b15!> is equally valid. Arranging the (i) left tags in ascending alphabetic order by block group name, and the (ii) right tags in descending alphabetic order by block group name, as initially presented is generally preferred.

EXAMPLE 9

Delete Block from Group(s)

Delete block from group(s). When this command is applied to a block, the list block's groups command (refer to Example 14 described below) is automatically invoked as the first step of this command. The block groups belonging to the group tags enclosing the block are listed. From this list of block groups, a user can select the block groups from which the given block is to be dissociated. Preferably, the user is provided with a cautionary message to confirm whether the delete action is intended, before the selected block groups' tags are actually deleted from the block.

By way of example, let the block "The information on X" belong to block groups b2, b5, b8. The block with its enclosing group tags would appear as: <!b2><!b5><!b8>The information on X<b8!><b5!><b2!>. The list block's groups command displays b2, b5, b8. If blocks b2 and b8 are selected for deletion, then the corresponding tags for these blocks are removed from the block. After deletion, the remaining tags enclosing this block appear as: <!b5>The information on X<b5!>.

EXAMPLE 10

Delete Group(s)

Delete group(s). The list of current block groups is displayed by an automatic invocation of the list groups command (an example of which is given below). The user can select one or several block groups from this displayed list of current block groups. All instances of pairs of block group tags associated with each of the block group selected by the user are consequently removed from the document. The list of block groups is then updated by removing the selected block groups from the list.

By way of example, let the automatic invocation of list groups command display the block groups b1, b4, b5, b6, b8, b15, b16, b18, b20. From this displayed list, select b4, b5, and b8 for deletion. For each selected block group, create respective tag pairs. These are (<!b4>, <b4!>) for block b4, (<!b5>, <b5!>) for block b5, and (<!b8>, <b8!>) for block b8. From the document D, delete all instances of each of the tags <!b4>, <b4!>, <!b5>, <b5!>, and <!b8>, <b8!>. As a result, block groups b4, b5, and b8 cease to exist. The list of block groups is updated by deleting the block groups b4, b5, and b8 from it.

EXAMPLE 11

Edit Block

Edit block. When this command is applied to a block, all editing operations are confined to the block alone. Preferably, the block is highlighted during the editing operations.

By way of example, consider the following text.
<!b15>The talking parrot<b15!> and the dumb man were a fine pair. They went together everywhere. The man was oblivious of the chatter <!b15>the parrot<b15!> would sometimes indulge in. The indifference did not seem to matter <!b15>to the parrot<b15!>.

Suppose that the block "the parrot" is selected, then the edit block command highlights the selected block and permits editing of the block. For example, this block may be edited to: "the green feathered parrot". After adding its current tags, the block appears as: <!b15>the green feathered parrot<b15!>.

EXAMPLE 12

Edit Group

Edit group. In the block group selected to be edited, select a block that is a member of this block group (for example, by scrolling through the blocks in the group using commands such as next block, previous block, first block, last block or by using keys mapped to such commands).

The selected block is highlighted and editing is permitted within the highlighted block only. When editing of the block is complete, the user can scroll to another block in the block group selected to be edited and continue the editing operations in the other block. This sequence continues until terminated by the user.

EXAMPLE 13

Merge Groups

Merge groups. The list of current block groups is displayed by the system by automatic invocation of the list groups command (an example of which is given below). The user can select one or several block groups from this list of current block groups. The collection of selected block groups is referred to as the set-of-merging-groups. Then the block group (to-block-group) into which the selected block groups are to be merged is selected. The to-block-group can be an existing block group or a new block group yet to be created.

If a new block group is selected then a new block group name is created (that is, specified or assigned, as explained above in Example 7). Each block group tag belonging to any block group from the set-of-merging-groups is replaced with a corresponding (opening or closing) tag representative of the to-block-group. If the process produces multiple copies of a tag pair enclosing a block, then all but one copy of the tag pair is retained and the other copies deleted.

By way of example, consider the following text.
<!b15>The talking parrot<b15!> and the dumb man were a fine pair. They went together everywhere. The man was oblivious of the chatter <!b15>the parrot<b15!> would sometimes indulge in. The indifference did not seem to matter <!b15>to the parrot<b15!>. <!b2>The author of this story<b2!> was not a very good <!b3>story teller<b3!> but that did not deter him from telling one.

The list groups command, when invoked, lists the block groups as b2, b3, b15. Assume that the user selected b2 and b15 to belong to the set-of-merging groups, and b3 as the to-block-group. In the example, each instance of the tags <!b2> and <!b15> is replaced with the tag <!b3>. Likewise, each instance of <b2!>, and <b15!> is replaced with the tag <b3!>. The example text, after the merge groups operations, appears as follows.
<!b3>The talking parrot<b3!> and the dumb man were a fine pair. They went together everywhere. The man was oblivious of the chatter <!b3>the parrot<b3!> would sometimes indulge in. The indifference did not seem to matter <!b3>to the parrot<b3!>. <!b3>The author of this story<b3!> was not a very good <!b3>story teller<b3!> but that did not deter him from telling one.

EXAMPLE 14

List Block's Groups

List block's groups. The block groups to which a block belongs are listed, for example, by displaying the block groups on a video monitor or other suitable output device selected for the purpose.

By way of example, consider a tagged block: <!b2><!b5><!b8>The information on X<b8!><b5!><b2!>. On executing the list block's groups command the block groups b2, b5, and b8 will be displayed since the block "The information on X" is enclosed within the tags of these groups.

EXAMPLE 15

List Blocks in Group

List blocks in group. Each block belonging to a specified block group is displayed, individually, (for example, by using commands such as next block, previous block, first block, last block). A displayed block may be edited, if desired, by invoking the edit block command. Note that this command is similar to the edit block group.

EXAMPLE 16

List Groups

List groups. This command lists all the block groups whose tags are currently found in a document. For convenience, a list of block groups is maintained. This list is updated each time a block group is either created or deleted. The list groups command then outputs this list.

By way of example, consider the following text.
<!b15>The talking parrot<b15!> and the dumb man were a fine pair. They went together everywhere. The man was oblivious of the chatter <!b15>the parrot<b15!> would sometimes indulge in. The indifference did not seem to matter <!b15>to the parrot<b15!>. <!b2>The author of this story<b2!> was not a very good <!b3>story teller<b3!> but that did not deter him from telling one.

The list groups command, when invoked, lists the block groups as b2, b3, b15.

EXAMPLE 17

Display Block with Tags

Display block with tags. This command displays the block with all tags enclosing the block, and any tags that may be present within the block. Normal display of blocks is without any of the tags associated with the block.

EXAMPLE 18

Remove Tags from Block

Remove tags from block. Tags enclosing a selected block are displayed, as well as tags appearing within the selected block. The block may be selected, for example, by placing a cursor somewhere within the block. Tag pairs can be removed, pair-by-pair, by, say, highlighting a tag (either left or right tag of a pair) or by placing a cursor somewhere within the tag. The selected tag and its corresponding pair (for an unpaired tag within the selected block, the corresponding pair can be found outside the selected block) is deleted.

EXAMPLE 19

Compare Blocks

Compare blocks. Two blocks (not necessarily belonging to the same block group) are compared, and a Boolean result (that is, true or false) is returned. The result is true, if the blocks are identical, and false if the blocks are not identical. The comparison is done by ignoring the presence of group tags, if any, in the blocks being compared. That is, only the text is taken into account. Variations of this command are possible wherein, instead of an exact comparison, the comparison is made on the basis of a stated criterion, such as, making the comparison by ignoring the case and font of the characters in the blocks.

EXAMPLE 20

Prefix/Postfix Block to Group(s)

Prefix/postfix block to group(y). The list of current block groups is displayed by an automatic invocation of the list groups command and the user selects one or several block groups from the displayed list. The user then selects or specifies the block, which may contain block group tags, to be attached as a prefix or postfix to each member block of the selected block groups. If the selected or specified block contains any unpaired block group tags then such unpaired tags are removed from the block.

The block, including the remaining block group tags, is prefixed or postfixed, as selected by the user, from an options menu, for example, to each member block of the selected block groups. The operation sequence of the selection of block groups and the selection or specification of the block to be attached as a prefix or postfix may be reversed, if desired. Further, instead of attaching the selected or specified block to every member block of the selected block groups, the attachment may be done on a selection of member blocks.

By way of example, consider the following text.

<!b3>The talking parrot<b3!> and the dumb man were a fine pair. They went together everywhere. The man was oblivious of the chatter <!b3>the parrot<b3!> would sometimes indulge in. The indifference did not seem to matter <!b3>to the parrot<b3!>.

Suppose that the specified block to be attached as a postfix to the member blocks of block group b3 was: ", called <!b5>Green". Since the specified block contains the unpaired block group tag <!b5>, this unpaired block group tag is removed so that the specified block becomes: ", called Green". All member blocks belonging to the block group b3 are found, and to each of the member blocks the specified block: ", called Green" is postfixed.

The example text thus becomes:

<!b3>The talking parrot, called Green<b3!> and the dumb man were a fine pair. They went together everywhere. The man was oblivious of the chatter <!b3>the parrot, called Green<b3!> would sometimes indulge in. The indifference did not seem to matter <!b3>to the parrot, called Green<b3!>.

EXAMPLE 21

Find Block with String

Find block with string. The list of current block groups is displayed by an automatic invocation of the list groups command and the user selects one or several block groups from the displayed list. The user then specifies a string. The operation sequence of the selection of block groups and the specification of a string may be reversed, if desired.

This command then performs a search for the specified string in the member blocks of the selected block groups. Member blocks of each of the selected block group that contain the specified string are displayed individually (for example, by scrolling through the blocks in a group using commands such as next block, previous block, first block, last block). A block found during the search can be edited by invoking the edit block command. The find block with string command can be augmented, to include replacing the string with another string, or deleting the string altogether.

EXAMPLE 22

Find Block Satisfying Search Criteria

Find block satisfying search criteria. The list of current block groups is displayed by an automatic invocation of the list groups command and the user selects one or several block groups from the displayed list. The user then specifies a search criterion. The operation sequence of the selection of block groups and the specification of a search criterion may be reversed, if desired.

Member blocks of each of the selected block groups are scanned to check if the block satisfies the specified search criteria. Blocks that satisfy the search criteria are displayed individually (for example, by scrolling through the blocks in a group using commands such as next block, previous block, first block, last block). If desired, each displayed block can be edited by invoking the edit block command.

Tag Management

Some simple rules of tag management are enforced. These rules, of which there are nine, are each described below under corresponding subsections.

Rule 1

Block tags are normalized. That is, a block may not be enclosed with multiple copies of a pair of group tags. If multiple copies get generated, for example, during the execution of any of the above listed group commands, only one copy is retained. Generally, before enclosing a block with a pair of group tags, a check is made of whether the block is already enclosed by those tags. If not, then the tags are put in position around the block. By way of example, consider the following text.

<!b3><!b2><!b3>The talking parrot, called Green, is kept in a golden cage, which hangs in the palace courtyard of the princess. The young princess is not only very beautiful but also a very caring person.<b3!><b2!><b3!>

After eliminating the extra tags pair <!b3>, <b3!>, this example appears below.

<!b2><!b3>The talking parrot, called Green, is kept in a golden cage, which hangs in the palace courtyard of the princess. The young princess is not only very beautiful but also a very caring person.<b3!><b2!>

Rule 2

When a block is pasted in another part of the document, the block is pasted along with all is its associated pairs of tags. All unpaired tags inside the block are ignored.

Rule 3

If a part of a block (referred to as a sub-block) is copied and pasted to another part of the document, then at a user's discretion, the pairs of tags with which the innermost parent block is enclosed can be used to enclose the sub-block and the sub-block pasted along with those tags. Any unpaired tags within the sub-block are to be ignored during pasting. By way of example, consider the following text.

<!b3>The talking parrot, called Green, is kept in a golden cage, which hangs in the palace courtyard of the princess. <!b2>The young princess is not only very beautiful <!b4>but also a very caring person. The king's subjects adored her. <b2!><b3!><b4!>

If the sub-block in the above text: "The young princess is not only very beautiful but also a very caring person." is pasted elsewhere, then the sub-block, on user option, can appear with the enclosing tags of the innermost parent block in which the sub-block appears. In this case, the innermost parent block is "The young princess is not only very beautiful <!b4>but also a very caring person. The king's subjects adored her.", which is enclosed by the tag pair <!b2> and <b2!>. Since the sub-block has the unpaired tag <!b4>, this unpaired tag is ignored during pasting.

Consequently, the text: <!b2>The young princess is not only very beautiful but also a very caring person. <b2!> is pasted at the new location where the user is assumed to have opted for retaining the innermost parent block's enclosing tags. Preferably, the enclosing tags are pasted, if the user does not specify any option, on the reasonable assumption that instances of an existing sub-block when placed elsewhere are likely to remain related to each other in the context of the block groups associated with the existing sub-block. If this is not the case, then the tags can be removed by invoking remove tags from block command.

If a sub-block is being cut and pasted then the operations are similar to those of the copy and paste operations, except that the original sub-block is now deleted from its position while leaving behind all the unpaired block group tags contained within it.

Rule 4

A block already enclosed within a given pair of group tags cannot have one or both of same group's tags appearing within the block. Essentially, this means that two blocks belonging to the same block group cannot overlap each other in any manner. By way of illustration, the example below is not permitted.

<!b3>The talking parrot, called Green, is kept in a golden cage, which hangs in the palace courtyard of the princess. <!b3>The young princess is not only very beautiful but also a very caring person. <b3!>She is particularly loved by the old and the sick in the kingdom.<b3!> . . .

The reason for not permitting such overlaps is that these overlaps create ambiguity as to which are the actual blocks if there is a need to separate them. However, should this rule be violated due to the execution of one or more block-related commands, all intermediate tags appearing between the extreme opening tag and the extreme closing tag are deleted. Thus, the above example is automatically modified to appear as:

<!b3>The talking parrot, called Green, is kept in a golden cage, which hangs in the palace courtyard of the princess. The young princess is not only very beautiful but also a very caring person. She is particularly loved by the old and the sick in the kingdom.<b3!>

Rule 5

Two blocks; not belonging to the same block group, can overlap each other. That is, one tag from of one of the blocks can appear between the tags pair of the other block since there is no ambiguity in this case in identifying the blocks. The following is a valid illustration of this rule.

<!b2>The talking parrot, called Green, is kept in a golden cage, which hangs in the palace courtyard of the princess. <!b3>The young princess is not only very beautiful but also a very caring person. <b2!> She is particularly loved by the old and the sick in the kingdom.<b3!>

Rule 6

A block can appear embedded within another block provided both do not belong to the same block group. That is, the pair of tags of one block can appear within the tags pair of another, as illustrated in the following example.

<!b2>The talking parrot, called Green, is kept in a golden cage, which hangs in the palace courtyard of the princess. <!b3>The young princess is not only very beautiful but also a very caring person. <b3!> She is particularly loved by the old and the sick in the kingdom.<b2!>

Rule 7

All of a block's contents can be deleted during editing. However, the block's tags (either enclosing the block or contained within the block) are not deleted. By way of example, consider the following text.

<!b2>The talking parrot called Green, is kept in a golden cage, which hangs in the palace courtyard of the princess. <!b3>The young princess is not only very beautiful <!b4>but also a very caring person.<b4!>. <b21!>She is particularly loved by the old and the sick in the kingdom.<b3!>

The contents between the tags <!b4> and <b4!> are required to be deleted. This operation frequently occurs when editing a block or deliberately creating a block with the intention of marking a placeholder for future inclusion of new material. After deletion, the above example appears as follows.

<!b2>The talking parrot, called Green, is kept in a golden cage, which hangs in the palace courtyard of the princess. <!b3>The young princess is not only very beautiful <!b4><b4!>. <b2!> She is particularly loved by the old and the sick in the kingdom.<b3!>

Rule 8

Each block group tag must be paired.

Rule 9

A blank block (also referred to as a null block) can be created by, for example, placing the cursor at the intended location of the block and using the create block group command or add to block group(s) command, etc. Thus, the appearance of the tags <!b4><b4!>without any content in-between the tags in a document is permissible.

Advantages of Described Techniques

Related blocks in a document can be linked together into a group and the blocks searched and, if necessary, edited with relative ease. For editing purposes, group tags are normally not presented to the user, but their presence in the structure of the document assists in managing related blocks within the document.

Tagging blocks in the manner described above can be used in computer programming documents produced, for example, in integrated development environments. A group of consecutive statements can be treated as a block, and related code blocks as a block group. This arrangement can ease program editing and debugging, especially for large programs. For example, if an error is found in one block of statements, similar blocks in the same group can be readily tracked and checked for similar or related bugs.

In a document, blank or null blocks can be used as placeholders for material to be subsequently added. The use of blocks and block groups provide a means of indexing a document.

The described techniques can be implemented as additional features in a text editor product by anyone capable of writing a text editor.

Extension of Described Techniques to Multiple Documents/Files

A list of various participating files can be provided in, for example, a separate header file which the block editor can access, to allow the editor to edit (in the manner described above) across these multiple documents/files.

A preferred implementation of this is to create a single virtual file by concatenating all the participating files, say, in the order in which they appear in the header file. This may involve the use of virtual memory, if necessary. Inside the virtual file, markers are inserted to demarcate individual file boundaries. In addition, a mapping function is created to traverse between the virtual file and individual participating files to corresponding file contents. Note that, in principle, the files can be distributed in different storage locations connected by a network, as long as the mapping function takes these storage locations into account.

The block editor works on the virtual file. When saving the edited file, the mapping function is used to split up the virtual file and direct the pieces to the corresponding physical files.

EXAMPLE 23

The following example illustrates how the described techniques can be used to edit a manuscript, portions of which are reproduced below. The manuscript relates to weather modeling. The words listed below are used as block group names:
  atmosphere
  earth
  hydrosphere
  cryosphere
  biosphere Further, a few special keywords are used, as listed directly below. These keywords are selected with future editing requirements in mind.
  revise
  verify
  consult
  cite etc.

For ease of understanding, the tags use the keywords as block group names to indicate the block group to which they refer, rather than automatically generated block group names. Thus, the opening (left) tag relating to the block group hydrosphere is: <!hydrosphere> and the corresponding closing (right) tag is: <hydrosphere!>, for use in marking blocks as belonging to the block group hydrosphere.

Those familiar with weather modeling may understand a contextual link between the keywords: hydrosphere, atmosphere, earth, or among the keywords: biosphere, atmosphere, earth, and so on. On this basis, the text segments under consideration are as follows:

Segment 1

<!atmosphere><!earth><!hydrosphere>As a thermodynamic system, the atmosphere is neither isolated nor closed. It interacts with a number of other earth systems, notably the hydrosphere, the cryosphere, the lithosphere, and the biosphere <!cite><cite!>. And its most important source of heat energy is the sun. The interaction is by means of fluxes of mass, momentum, and energy. The totality of all the interacting earthly systems forms the earth's climate system. We shall presently differentiate between climate and weather. <hydrosphere!><earth!><atmosphere!>

Segment 2

<!earth>The earth, along with the rest of the solar system, is about 4.6 billion ($4.6 \times 10^9$) years old and has reached a near steady-state condition on time scales of interest to us. The earth began as a fiery mass of rotating gas which has cooled down to its present state. It is nearly spherical (oblate spheroidal). <!verify>Its polar radius is 6357 km and equatorial radius 6378 km. <earth!><verify!>

Segment 3

<!atmosphere><!earth><!hydrosphere>The earth is shrouded by a gaseous atmosphere, and about two-thirds of the earth's surface is covered by the deep oceans. The atmosphere and the oceans are described briefly in <!revise>Sections 1.1.3 and 1.1.4,<revise!>respectively. <hydrosphere!><earth!><atmosphere!>

Segment 4

<!atmosphere><!earth>The outermost layer of the earth is the gaseous atmosphere which extends radially to a few hundred kilometers; but to us only the first ~10 km are important because most weather phenomena occur within this height. The thickness of the atmosphere, compared to the earth's radius, is so small that on an ordinary office globe, it can scarcely be represented by more than the thickness of a coat of paint. The atmosphere holds only $0.88 \times 10^{-6}$% of the earth's mass. More than 99% of the mass of the atmosphere is found below an altitude of 30 km.<earth!><atmosphere!>

Segment 5

<!atmosphere><!earth><!hydrosphere>The hydrosphere comprises all the water in liquid phase distributed on the earth. Thus it includes the oceans, interior seas, rivers, lakes, and subterranean waters. Of these, the oceans play a particularly important role in shaping the earth's climate. They cover about 71% of the earth's surface and carry about 0.00023% of the earth's mass. Their heat capacity is large and they are an enormous reservoir of heat.<earth!><hydrosphere!> They play a dominant role in controlling greenhouse gases, global heat transfer, and weather patterns. <atmosphere!>

Segment 6

<!cryosphere><!earth>The cryosphere comprises the large masses of snow and ice on the earth's surface. It includes the ice on the poles, other continental glaciers, sea ice, snow fields, and permafrost in the northern parts of the American and Eurasian continents. Permafrost underlies about 20% of the earth's land surface. Indeed, most of the land masses of Alaska, northern Canada, and Northeast Asia are permanently frozen (hence the name permafrost).<earth!><cryosphere!>

Segment 7

<!biosphere><!earth>The biosphere comprises all terrestrial vegetation, the continental fauna, and the flora and fauna of the oceans. Vegetation alters surface roughness, evaporation, runoff, and surface albedo. They also play a role in the carbon dioxide balance in the atmosphere and the oceans through respiration and photosynthesis. Lately, there has been concern that human activities, such as, agriculture, urbanization, forest burning, etc., may have begun to contribute significantly to the evolution of the climatic system, by injecting such pollutants into the atmosphere as carbon dioxide, methane, chlorofluorocarbons, etc. <earth!><biosphere!>

The task of finding blocks that contain information related to the earth involves using the edit group command and selecting the block group earth. These operations will find and display all such blocks that are enclosed inside the tag pair <!earth>, <earth!>. In this case the identified blocks are segments 1 to 4, 5 (except for the last sentence), and also segments 6 to 7.

Likewise, blocks that are marked verify can be easily determined by using the edit group command and selecting the block group verify, which in this case displays the last sentence in segment 2, and one can proceed to verify, for example, the numbers appearing in the block.

The task of finding blocks containing the string "heat" in the block group earth involves using the find block with string command and providing the required block and string information. This command displays blocks which are segment 1 and segment 5 (except the last sentence).

In segment 1 the tags pair <!cite><cite!> appear. In this instance, the intention is to leave a placeholder to cite one or more references from which additional details regarding the matter can be obtained.

Computer Software

Incorporation of block-related features described above in an existing software product, such as a word processor, can be done, for example, by modifying its existing menus and command lists to include block and block group commands. In addition, the function routines required to execute these commands can be collated into a module and integrated with the existing software product. Such integration and/or modification as is necessary can be provided by those skilled in the relevant art.

Computer Hardware

Figure 2:
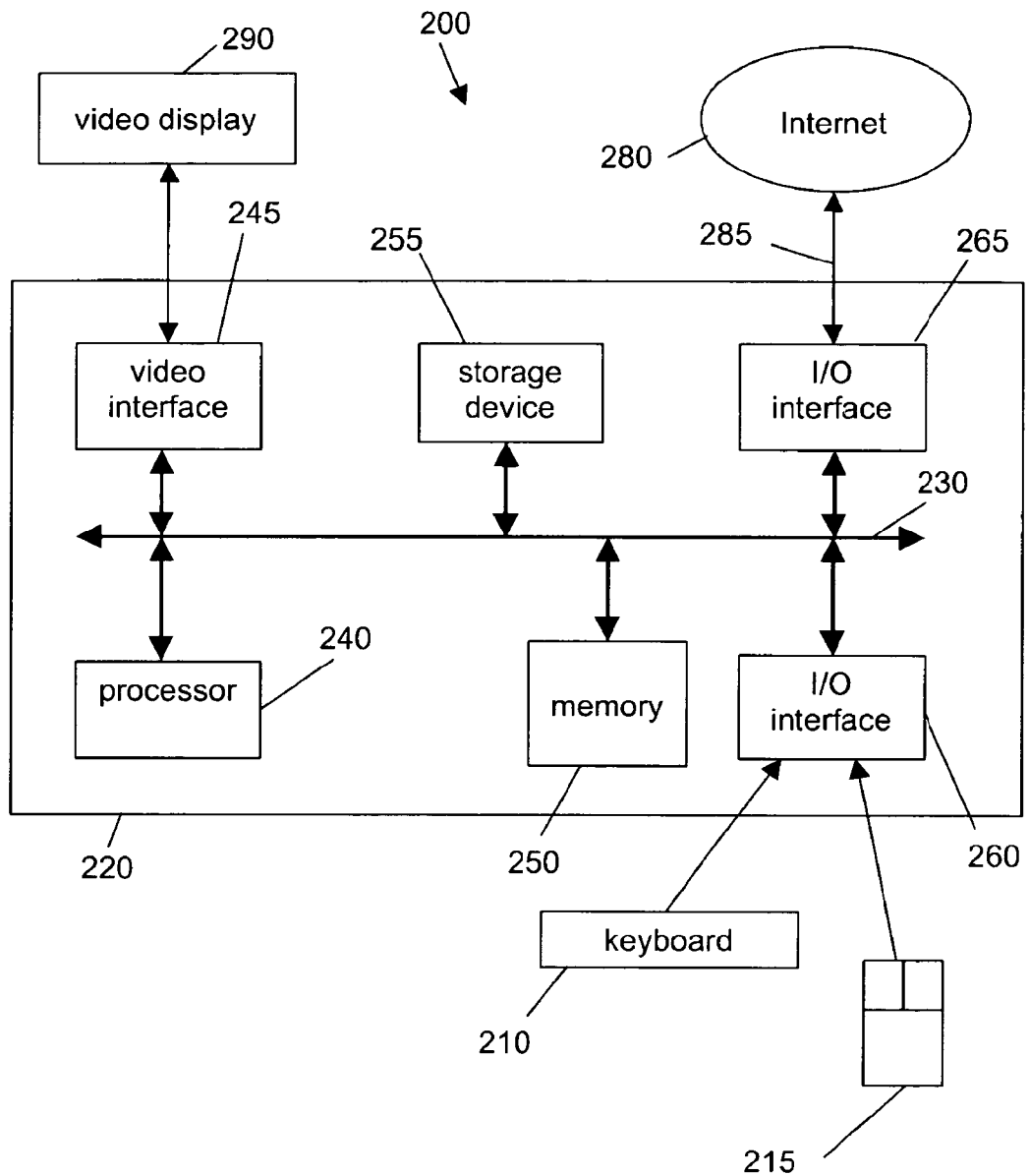
FIG. 2 is a schematic representation of a computer system suitable for executing computer software for performing the techniques described herein.

FIG. 2 is a schematic representation of a computer system 200 which can be used to perform steps in a process which implements the techniques described herein. The computer system 200 is provided for the purpose of executing computer software which is programmed to assist in performing the described techniques. This computer software executes under a suitable operating system installed on the computer system 200.

The computer software involves a set of programmed logic instructions that are able to be interpreted by the computer system 200 for instructing the computer system 200 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software which has a binary format suitable for execution by the operating system. The computer software is programmed in a manner which involves various software components, or code means, that perform particular steps in the process of the described techniques.

The components of the computer system 200 include: a computer 220, input devices 210, 215 and video display 290. The computer 220 includes: processor 240, memory module 250, input/output (I/O) interfaces 260, 265, video interface 245, and storage device 255.

The processor 240 is a central processing unit (CPU) that executes the operating system and the computer software executing under the operating system. The memory module 250 include random access memory (RAM) and read-only memory (ROM), and is used under direction of the processor 240.

The video interface 245 is connected to video display 290 and provides video signals for display on the video display 290. User input to operate the computer 220 is provided from input devices 210, 215 consisting of keyboard 210 and mouse 215. The storage device 255 can include a disk drive or any other suitable non-volatile storage medium.

Each of the components of the computer 220 is connected to a bus 230 that includes data, address, and control buses, to allow these components to communicate with each other via the bus 230.

The computer system 200 can be connected to one or more other similar computers via a input/output (I/O) interface 265 using a communication channel 285 to a network 280, represented as the Internet.

The computer software program may be provided as a computer program product, and recorded on a portable storage medium. In this case the computer software program is accessed by the computer system 200 from the storage device 255. Alternatively, the computer software can be accessed directly from the network 280 by the computer 220. In either case, a user can interact with the computer system 200 using the keyboard 210 and mouse 215 to operate the programmed computer software executing on the computer 220.

The computer system 200 is described for illustrative purposes: other configurations or types of computer systems can be equally well used to implement the described techniques. The foregoing is only an example of a particular type of computer system suitable for implementing the described techniques.

Conclusion

A computer implementable method (and apparatus and software for implementing the method) is described for keeping track of a group of interrelated text blocks in a document. Features of the described techniques can be provided as add-on features to desktop publishing software applications such as text editors, word processors, databases, etc.

Various alterations and modifications can be made to the techniques and arrangements described herein, as would be apparent to one skilled in the relevant art.

I claim:

1. A method of editing an electronic document comprising symbols, the method comprising:

presenting a block-selecting command by a computer system to a user for selecting and defining blocks in the document;

receiving, by the computer system, user selections of blocks of one or more of the symbols in the document that pre-exist the user selections via the block-selecting command, including user-selections in which one block overlaps another block;

presenting a group-defining command by the computer system to the user for selecting and defining user-named groups of the blocks, wherein the groups comprise respective sets of the blocks;

receiving, by the computer system, user selections and user-defined names of such groups via the group-defining command;

altering the document by the computer system in response to the received, user-selections of blocks and groups, wherein the altering incorporates into the document identifications of the user-selected groups and blocks according to the user-defined names, including incorporating respective opening group name tags at the beginnings and closing group name tags at the endings of the respective user-selected blocks, to delimit the user-selected blocks and to define membership of the blocks in the user-selected and user-named groups, wherein the altered document is stored on a computer-readable storage medium;

presenting group commands by the computer system to the user for listing or modifying one or more of the groups;

receiving, by the computer system, user selections of one or more of the group commands and one or more of the groups to which the one or more of the selected group commands shall apply;

modifying, if a received one of the group commands is for modifying, one or more of the selected groups by the computer system in response to the received selections of one or more of the group commands and one or more of the groups to which the one or more of the selected group commands shall apply; and presenting a list to the user by the computer system, if a received one of the group commands is for listing, wherein the presenting of the list is in response to the received selections of one or more of the group commands and one or more of the groups to which the one or more of the selected group commands shall apply, wherein the list sets out one or more of the selected groups.

2. The method of claim 1, wherein the method further comprises:
presenting a block command by the computer system to the user for pasting a copy of at least a partial block;
receiving, by the computer system, a user selection of only a partial one of the blocks and the block command for pasting a copy of only the selected partial one of the blocks, the selected partial block being a portion of an associated entire block, and responsively pasting the copy of the selected partial block by the computer system, wherein the pasting includes pasting a pair of innermost tags associated with delimiting the associated entire block, but not pasting unpaired tags inside the selected partial block.

3. The method of claim 1, wherein the method further comprises:
deleting by the computer system, responsive to a group having first and second blocks in common as members and the computer system receiving a user command attempting to create an overlap between the first and second blocks, all block tags for the first and second blocks that would otherwise appear between an opening tag at one extreme of the first and second blocks and a closing tag at another extreme of the first and second blocks.

4. The method of claim 1, wherein the method further comprises:
deleting by the computer system, responsive to receiving a user command attempting to assign both a first and second block having an overlap therebetween to membership in a common group, all block tags for the first and second blocks that would otherwise appear between an opening tag at one extreme of the first and second blocks and a closing tag at another extreme of the first and second blocks.

5. The method of claim 1, wherein responsive to the computer system receiving a user command attempting to generate multiple instances of a unique pair of opening and closing group name tags, the modifying comprises:
generating, by the computer system, only one instance of the unique pair of opening and closing name tags.

6. A computer system for editing a text-based electronic document, the computer system comprising:
a processor and a storage device, wherein the storage device stores certain computer software on a medium readable by the computer system and the processor is operable to access the computer software from the storage device to perform:
presenting a block-selecting command by a computer system to a user for selecting and defining blocks in the document;
receiving, by the computer system, user selections of blocks of one or more of the symbols in the document that pre-exist the user selections via the block-selecting command, including concurrent user-selections in which one block overlaps another block presenting a group-defining command by the computer system to the user for selecting and defining user-named groups of the blocks, wherein the groups comprise respective sets of the blocks;
receiving, by the computer system, user selections and user-defined names of such groups via the group-defining command;
altering the document by the computer system in response to the received, user-selections of blocks and groups, wherein the altering incorporates into the document identifications of the user-selected groups and blocks according to the user-defined names, including incorporating respective opening group name tags at the beginnings and closing group name tags at the endings of the respective user-selected blocks, to delimit the user-selected blocks and to define membership of the blocks in the user-selected and user-named groups, wherein the altered document is stored on a computer-readable storage medium;
presenting group commands by the computer system to the user for listing or modifying one or more of the groups;
receiving, by the computer system, user selections of one or more of the group commands and one or more of the groups to which the one or more of the selected group commands shall apply;
modifying, if a received one of the group commands is for modifying, one or more of the selected groups by the computer system in response to the received selections of one or more of the group commands and one or more of the groups to which the one or more of the selected group commands shall apply; and
presenting a list to the user by the computer system, if a received one of the group commands is for listing, wherein the presenting of the list in response to the received selections of one or more of the group commands and one or more of the groups to which the one or more of the selected group commands shall apply, wherein the list sets out one or more of the selected groups.

7. The computer system of claim 6, wherein the processor is operable to access the computer software from the storage device to perform:

presenting a block command by the computer system to the user for pasting a copy of at least a partial block;

receiving, by the computer system, a user selection of only a partial one of the blocks and the block command for pasting a copy of only the selected partial one of the blocks, the selected partial block being a portion of an associated entire block, and responsively pasting the copy of the selected partial block by the computer system, wherein the pasting includes pasting a pair of innermost tags associated with delimiting the associated entire block, but not pasting unpaired tags inside the selected partial block.

8. The computer system of claim 6, wherein the processor is operable to access the computer software from the storage device to perform:

deleting by the computer system, responsive to a group having first and second blocks in common as members and the computer system receiving a user command attempting to create an overlap between the first and second blocks, all block tags for the first and second blocks that would otherwise appear between an opening tag at one extreme of the first and second blocks and a closing tag at another extreme of the first and second blocks.

9. The computer system of claim 6, wherein the processor is operable to access the computer software from the storage device to perform:

deleting by the computer system, responsive to receiving a user command attempting to assign both a first and second block having an overlap therebetween to membership in a common group, all block tags for the first and second blocks that would otherwise appear between an opening tag at one extreme of the first and second blocks and a closing tag at another extreme of the first and second blocks.

10. The computer system of claim 6, wherein responsive to the computer system receiving a user command attempting to generate text including multiple instances of a unique pair of opening and closing group tags, the modifying comprises:

generating, by the computer system, only one instance of the unique pair of opening and closing tags.

11. The computer system as claimed in claim 6, wherein the presenting of the list to the user further comprises:

presenting, responsive to a first one of the received group commands, a list of blocks in a selected one of the groups; and presenting, responsive to a second one of the received group commands, a list of groups in which a selected one of the blocks is included.

12. Computer software, recorded on a storage device readable by a computer system, for editing a text-based electronic document, wherein the computer software is operable to enable computer system to perform:

presenting a block-selecting command by a computer system to a user for selecting and defining blocks in the document;

receiving, by the computer system, user selections of blocks of one or more of the symbols in the document that pre-exist the user selections via the block-selecting command, including concurrent user-selections in which one block overlaps another block presenting a group-defining command by the computer system to the user for selecting and defining user-named groups of the blocks, wherein the groups comprise respective sets of the blocks;

receiving, by the computer system, user selections and user-defined names of such groups via the group-defining command;

altering the document by the computer system in response to the received selections of blocks and groups, wherein the altering incorporates into the document identifications of the user-selected groups and blocks according to the user-defined names, including incorporating respective opening group name tags at the beginnings and closing group name tags at the endings of the respective user-selected blocks, to delimit the user-selected blocks and to define membership of the blocks in the user-selected and user-named groups, wherein the altered document is stored on a computer-readable storage medium;

presenting group commands by the computer system to the user for listing or modifying one or more of the groups;

receiving, by the computer system, user selections of one or more of the group commands and one or more of the groups to which the one or more of the selected group commands shall apply;

modifying, if a received one of the group commands is for modifying, one or more of the selected groups by the computer system in response to the received selections of one or more of the group commands and one or more of the groups to which the one or more of the selected group commands shall apply; and presenting a list to the user by the computer system, if a received one of the group commands is for listing, wherein the presenting of the list in response to the received selections of one or more of the group commands and one or more of the groups to which the one or more of the selected group commands shall apply, wherein the list sets out one or more of the selected groups.

13. The computer software of claim 12, wherein the computer software is operable to enable computer system to perform:

presenting a block command by the computer system to the user for pasting a copy of at least a partial block;

receiving, by the computer system, a user selection of only a partial one of the blocks and the block command for pasting a copy of only the selected partial one of the blocks, the selected partial block being a portion of an associated entire block, and responsively pasting the copy of the selected partial block by the computer system, wherein the pasting includes pasting a pair of innermost tags associated with delimiting the associated entire block, but not pasting unpaired tags inside the selected partial block.

14. The computer software of claim 12, wherein the computer software is operable to enable computer system to perform:

deleting by the computer system, responsive to a group having first and second blocks in common as members and the computer system receiving a user command attempting to create an overlap between the first and second blocks, all block tags for the first and second blocks that would otherwise appear between an opening tag at one extreme of the first and second blocks and a closing tag at another extreme of the first and second blocks.

15. The computer software of claim 12, wherein the computer software is operable to enable computer system to perform:

deleting by the computer system, responsive to receiving a user command attempting to assign both a first and second block having an overlap therebetween to membership in a common group, all block tags for the first and second blocks that would otherwise appear between an opening tag at one extreme of the first and second blocks and a closing tag at another extreme of the first and second blocks.

16. The computer software of claim 12, wherein responsive to the computer system receiving a user command attempting to generate multiple instances of a unique pair of opening and closing group name tags, the modifying comprises:

generating, by the computer system, only one instance of the unique pair of opening and closing name tags.

17. The computer software as claimed in claim 12, wherein the presenting of the list further comprises:

presenting, responsive to a first one of the received group commands, a list of blocks in a selected one of the groups; and presenting, responsive to a second one of the received group commands, a list of groups in which a selected one of the blocks is included.

* * * * *